United States Patent
Patil et al.

(10) Patent No.: US 10,611,953 B2
(45) Date of Patent: Apr. 7, 2020

(54) CONTROLLED RELEASE OF WELL TREATMENT AGENTS INTO OIL WELLS

(71) Applicant: Finoric LLC, Beasley, TX (US)

(72) Inventors: Deepak Patil, Friendswood, TX (US); Ambrish Kamdar, Sugar Land, TX (US)

(*) Notice: Subject to any disclaimer, the term of this patent is extended or adjusted under 35 U.S.C. 154(b) by 0 days.

(21) Appl. No.: 15/746,309

(22) PCT Filed: Jul. 20, 2016

(86) PCT No.: PCT/US2016/043137
§ 371 (c)(1),
(2) Date: Jan. 19, 2018

(87) PCT Pub. No.: WO2017/015372
PCT Pub. Date: Jan. 26, 2017

(65) Prior Publication Data
US 2018/0215995 A1  Aug. 2, 2018

Related U.S. Application Data

(60) Provisional application No. 62/196,186, filed on Jul. 23, 2015.

(51) Int. Cl.
| | |
|---|---|
| E21B 43/26 | (2006.01) |
| C09K 8/72 | (2006.01) |
| C09K 8/70 | (2006.01) |
| C09K 8/524 | (2006.01) |
| C09K 8/528 | (2006.01) |
| C09K 8/92 | (2006.01) |
| C09K 8/60 | (2006.01) |

(Continued)

(52) U.S. Cl.
CPC .............. *C09K 8/725* (2013.01); *C09K 8/524* (2013.01); *C09K 8/528* (2013.01); *C09K 8/54* (2013.01); *C09K 8/605* (2013.01); *C09K 8/68* (2013.01); *C09K 8/70* (2013.01); *C09K 8/92* (2013.01); *E21B 37/06* (2013.01); *E21B 41/02* (2013.01); *C09K 2208/08* (2013.01); *C09K 2208/22* (2013.01); *C09K 2208/32* (2013.01); *E21B 43/26* (2013.01)

(58) Field of Classification Search
None
See application file for complete search history.

(56) References Cited

U.S. PATENT DOCUMENTS 3,305,019 A   2/1967  Katzer
3,630,280 A * 12/1971 Fischer ................. E21B 33/138
                                              166/283

(Continued)

*Primary Examiner* — Angela M DiTrani Leff

(57) ABSTRACT

It is common to require oil-well treating chemicals to be introduced into subterranean geological formations over the well's drilling, stabilization and extraction phases. The timely controlled and uniform release of such chemicals throughout the fluid bed vastly enhances their effectiveness. A method is disclosed for introducing such oil-well treating chemicals throughout the subterranean formation by encapsulating the chemicals within engineered composites, which are introduced into the subterranean formations along with the other fluids. These engineered composites are formed to slowly release the oil-well treating chemicals once they are in the subterranean formations as the engineered composites slowly dissolve.

4 Claims, 1 Drawing Sheet

The Phosphorus Levels Were Then Plotted Against Pore Volume

(51) Int. Cl.
*C09K 8/54* (2006.01)
*C09K 8/68* (2006.01)
*E21B 37/06* (2006.01)
*E21B 41/02* (2006.01)

(56) References Cited

U.S. PATENT DOCUMENTS

| | | | | |
|---|---|---|---|---|
| 4,518,509 A | * | 5/1985 | Newberry | C09K 8/92 44/346 |
| 4,588,640 A | * | 5/1986 | Matlach | C08F 8/14 428/402.21 |
| 4,614,599 A | * | 9/1986 | Walker | C09K 8/03 175/72 |
| 4,656,205 A | * | 4/1987 | Walker | A61K 9/1635 507/902 |
| 4,741,401 A | * | 5/1988 | Walles | C09K 8/685 166/300 |
| 4,905,762 A | * | 3/1990 | Zilch | C09K 8/524 166/310 |
| 4,919,209 A | * | 4/1990 | King | C09K 8/64 166/300 |
| 4,986,353 A | * | 1/1991 | Clark | C09K 8/516 166/279 |
| 5,073,276 A | * | 12/1991 | Newlove | A61K 9/1635 166/304 |
| 6,162,766 A | * | 12/2000 | Muir | C09K 8/62 428/403 |
| 6,723,683 B2 | * | 4/2004 | Crossman | C08L 3/00 507/110 |
| 7,493,955 B2 | * | 2/2009 | Gupta | C09K 8/516 166/279 |
| 7,598,209 B2 | * | 10/2009 | Kaufman | C09K 8/524 507/269 |
| 7,994,103 B2 | * | 8/2011 | Campbell | C09K 8/536 507/263 |
| 8,393,395 B2 | * | 3/2013 | Cochet | C09K 8/706 166/300 |
| 9,631,139 B2 | * | 4/2017 | Johnson | C09K 8/882 |
| 9,796,919 B2 | * | 10/2017 | Chang | C09K 8/52 |
| 9,976,070 B2 | * | 5/2018 | Gupta | C09K 8/524 |
| 2004/0014607 A1 | * | 1/2004 | Sinclair | C09K 8/516 507/200 |
| 2004/0043906 A1 | * | 3/2004 | Heath | C09K 8/536 507/200 |
| 2004/0115378 A1 | | 6/2004 | Dunaway et al. | |
| 2006/0166838 A1 | | 7/2006 | Collins et al. | |
| 2012/0252706 A1 | * | 10/2012 | Steiner | C09K 8/536 507/204 |
| 2016/0075941 A1 | | 3/2016 | Duenckel et al. | |

* cited by examiner

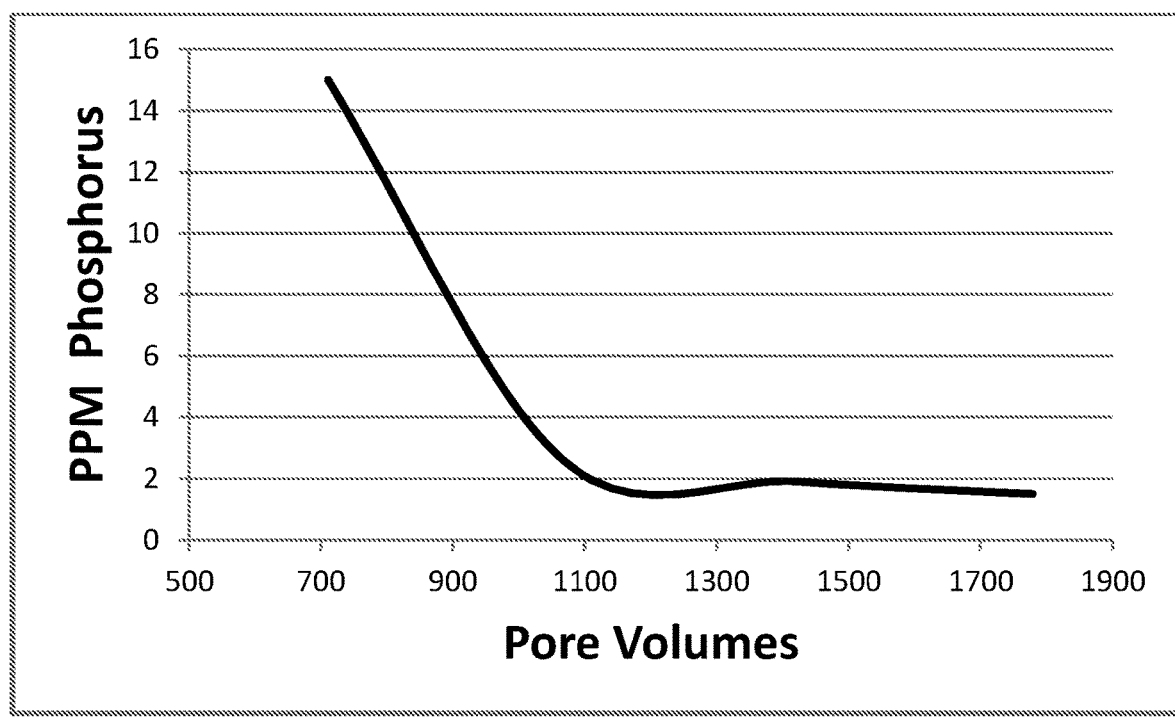
The Phosphorus Levels Were Then Plotted Against Pore Volume

CONTROLLED RELEASE OF WELL TREATMENT AGENTS INTO OIL WELLS

CROSS-REFERENCE

The present application claims the benefit of U.S. Provisional Patent Application No. 62/196,186, filed on 23 Jul. 2015, which is hereby incorporated by reference herein in its entirety, including but not limited to those portions that specifically appear herein.

FIELD OF INVENTION

Invention relates to a novel method of stimulating a subterranean formation by injecting well treatment agents formulated into an engineered composite into subterranean formations wherein the composite dissolves at a controlled rate over an extended time period, releasing the well treatment agents at a controlled rate without impacting conductivity within the formation.

BACKGROUND OF INVENTION

Oilfield fluids (e.g., oil, gas, and water) generally comprise complex mixtures of aliphatic hydrocarbons, aromatics hydrocarbons, heteroatomic molecules, anionic and cationic salts, acids, sands, silts, and clays. Other materials also may be contained in oilfield fluids.

Oilfield fluids, when subjected to severe conditions, comprising heat, pressure, and turbulence, during retrieval, often lead to scale formation, salt formation, paraffin deposition, emulsification (both water-in-oil and oil-in-water), gas hydrate formation, corrosion, asphaltene precipitation, and paraffin formation within oil and/or gas production wells and on the surfaces of equipment external to the subterranean formations.

Scale and other deposits typically decrease permeability of, and therefore conductivity within, the subterranean formation, reducing well productivity and shortening the lifetime of production equipment.

Well treatment agents are often used in production wells to prevent the deleterious effects caused by such formations and precipitates. For instance, scaling in the formation and/or in the production lines downhole and at the surface is often controlled by the use of scale inhibitors.

At the present, in order to clean scales from wells and equipment, typically it is necessary to stop production to add treatment agents, which is both time-consuming and costly.

For instance, scaling in the formation and/or in the production lines downhole and at the surface may be controlled by the use of scale inhibitors.

One approach has been to continuously inject well treating agents. For example, see U.S. Pat. No. 8,343,897. This method teaches that the treatment be made after stimulation or hydraulic fracturing has concluded, or that production to be stopped while the treating agents are introduced.

U.S. Pat. No. 7,493,955, discloses a method of introducing well treatment additives adsorbed on activated carbon, silica particulates, precipitated silica, zeolite, diatomaceous earth, ground walnut shells, fuller's earth and organic synthetic high molecular weight polymers. However, these insoluble absorbents remain in the formation after the treatment within the proppant pack or the fracture after all the well treatment agents have been released from the absorbent, thereby causing a reduction in permeability and conductivity within subterranean formations.

US Patent Application No. 2006166838 discloses a method for the preparation of microparticles for treating hydrocarbon bearing formations wherein a well treatment agent is enclosed on the polymer carrier, which degrades to allow the treatment agents to be released.

Patent Application No. WO2016003304 discloses a composite proppant wherein a solid proppant is contained within a polymeric carrier. When the polymer degrades a solid proppant remains, which may reduce the permeability and conductivity within subterranean formations.

US Patent Application No. 2004115378 discloses a delivery system for a controlled release of downhole additives wherein the additive is enclosed within a water dispersible container. This system depends on large porous particles that allow the agents to permeate through the pores.

US Patent Application No. 2004043906 discloses use of a polymeric material that is permeable and forms a matrix of polymer to encapsulate the treatment agents. This invention teaches that the treatment agents are desorbed from the matrix. After all the treatment agent is exhausted from the polymer matrix, the polymer shell remains and will reduce the conductivity.

US Patent Application No. 2016075941 discloses the use of a mixture of porous and nonporous proppant compositions. The non-degradable proppant is encapsulated within the degradable polymeric shell. The useful of such a product depends on the degradation or hydrolysis rate of the polymer which is uncontrollable as it depends on the subterranean conditions. After all the treatment agent is exhausted from the outer shell of the proppant, the inner insoluble shell remains and will reduce the conductivity.

U.S. Pat. No. 3,305,019 discloses a composition for stimulating gas production.

No composite or method has been found that is capable of a controlled release of treating agents under harsh conditions without leaving insoluble materials within the subterranean formations, thereby reducing conductivity within the formation.

Thus, there is a need for a method that provides a controlled slow release of well treating chemical without stopping production from the well and that does not leave unwanted detrimental materials in the well that reduce conduction.

SUMMARY OF INVENTION

What is revealed in this application is a novel method for delivering one or more well treatment agents formulated in the form of a solid composite into subterranean formations.

The method comprises injecting an engineered composite that carries all of the well treatment agents with the typical oil field fluid on a one-time basis into subterranean formations. The hereinafter the engineered composite is sometimes referred to as "COMPOSITE".

The engineered composite is essentially comprised of a slightly soluble substrate and one or more well treatment agents. Inorganic salts, acids or bases may be added in certain cases.

The method comprises placing the engineered composite into subterranean formations during any phase of the stimulation or production process by injecting the engineered composite along with typical well injection fluids. Once downhole, the slightly soluble substrate slowly dissolves in the oil/water matrix allowing the well treatment agents to be gradually released. At the end of the release of the well treatment agents, there is no residual remaining in the subterranean formation to reduce conduction.

Suitable well treatment agents may be selected from the group of agents consisting of scale inhibitors, salt formation inhibitors, paraffin inhibitors, demulsifiers (both water-in-oil and oil-in-water), gas hydrate inhibitors, corrosion inhibitors, asphaltene inhibitors or dispersants, foaming agents, defoamers, oxygen scavengers, oxidizers, biocides, surfactants, and inhibitors of other unwanted in-well formation.

Examples of scale inhibitors or modifiers comprise phosphates, phosphate esters, phosphoric acid, phosphonates, phosphinates, phosphonic acid, polymers containing acryl and/or methacryl nitrile, acid, acid salts, amides, alcohols, quaternary, sulfonated, phosphonated, carboxylic acid monomers such as maleic, fumaric, itaconic or salts thereof, hydroxyacrylates, methacrylates, or vinyl monomers such as esters and alcohols, chelating agents, and mixtures thereof.

Other well-treating agents are well known in the field.

The engineered composite substrate may be selected from the group that includes polymers, a blend of polymers with inorganic or organic compounds, and non-polymeric materials.

The polymer substrates may be selected from a group consisting of polyolefins, polyesters, polyamides, polycarbonates, polyacetals, polymelamines, polyvinyl chlorides, polyvinyl acetates, polyvinyl esters, polyacrylates, bisphenols, and isocyanates, copolymers of these monomers, and blends of the polymers or copolymers.

For example, a engineered composite substrate was made from a blend of bisphenol-A, ethylene vinyl acetate copolymer and polylactic acid.

The inorganic or organic compounds may be blended with polymer substrates to form materials having a desired melting point and glass transition temperature, a desired rigidity, a desired plasticity, and a desired solubility.

The melting point and the glass transition temperature of the engineered composite is greater than 100° F. The solubility of the engineered composite is less than 1% at 60° F. and less than 10% at 350° F. The rigidity and plasticity of the engineered composite is such that granules made from the engineered composite will not crush under compression of 30 pounds per square absolute ("psia").

The non-polymeric substrates of the engineered composite may be selected from a group consisting of fatty acid esters, phthalate esters, terephthalate esters, bisphenols, bisphenol based ethers, esters containing bisphenols and reactive, linear, heterocyclic, and aromatic compounds.

For example, compounds incorporated in the engineered composite may be bisphenol-A phthalates, bisphenol-A benzoate, bisphenol-A amino benzoate, glyceryl phthalate, glyceryl polyphthalates.

The amount of well treatment agent in the well treating COMPOSITE may range between a concentration of 1 ppm to a concentration of 99%, and preferably between a concentration of 2 ppm and a concentration of 1000 ppm.

The engineered composite may be used to prevent and/or control the formation of deposits in a production well, and to improve the well performance.

The engineered composite also may be used to control the rate of release of well treating agents in a production well.

BRIEF DESCRIPTION OF THE DRAWING

The FIGURE shows a plot of the phosphorous level versus pore size in a simulation of scale treatment using an engineered composite.

DETAILED DESCRIPTION OF THE INVENTION

The novel method comprises injecting a engineered composite that essentially comprises blending treating agents with a slightly soluble substrate. The engineered composite is then injected into subterranean formations with typical oil field fluids such that the treating agents are released at a controlled rate without leaving any residue to decrease conduction within the formation.

The engineered composite releases the well treatment agents into a targeted area at a rate controlled by the rate of dissolution of the well treatment agents from the engineered composite by controlling the size and shape of the engineered composite granules. The engineered composite blended particles are typically between 400 mesh and 60 mesh.

The method allows for a continuous supply of the well treatment agent into the targeted area during an extended time with a single injection and without decreasing conduction within the targeted area.

To form the engineered composite, a substrate material is transformed into a molten state, and then blended with a solid or a liquid well treatment agent. The blended material is allowed to solidify into granules.

For example, an engineered composite was made by blending magnesium aminotriphosphonate, ethylene vinyl acetate copolymer, polyacitc acid, and bisphenol phthalate at a temperature greater than 300° F., with continuous agitation, and then cooled to form engineered composite granules.

This process forms a dispersion or solid solution of the substrate and the treatment agent.

In another embodiment, a monomers of desired polymeric substrate was homogenously blended with a well treatment agent. The blend was then polymerized in-situ allowing cross-linking to form a solid engineered composite.

An exemplary engineered composite was made by blending magnesium amino trisphosphonate, bisphenol-A diglycidyl ether, and cross linked with tetraethylenepentamine with continuous agitation. When cooled, engineered composite granules were formed.

In another embodiment, a liquid well treatment agent was blended with a molten substrate, and then allowed to solidify.

An exemplary engineered composite was made by blending polyethyleneglycol of molecular weight of about 2000, which is a known defoamer, bisphenol-A diglycidyl ether, and cross linked with tetraethylenepentamine with continuous agitation. The granules of composite thus formed on cooling could be used for well treatment.

In another embodiment an engineered composite was made by blending polyethyleneglycol of molecular weight of about 2000, which is a known defoamer, with glycerine and crosslinked via transesterification with dimethylphthalate.

In another embodiment, a solid well treatment agent was dissolved in a molten substrate, which was then allowed to solidify.

An exemplary composite was made by blending aminotrisacetonitrile, bisphenol-A diglycidyl ether, and cross linked with tetraethylenepentamine with continuous agitation. The granules of composite thus formed could be used for well treatment.

In another embodiment, a solid well treatment agent was pulverized and then blended with the desired substrate.

An exemplary composite was made by blending finely ground magnesium amino trisphosphonate that had passed through a 100 mesh screen, ethylene vinyl acetate copolymer, polylactic acid, and bisphenol phthalate at a temperature greater than 300° F. with continuous agitation, which upon cooling forms granules.

Once the substrate and the well treating agents are formed into a solid engineered composite, the resulting material is shaped into a desired form, for example, extruded, prilled, flaked, drawn into fibers, or formed into disks or flakes. The engineered composites may be in be spherical, cylindrical, conical, cubic, or irregular in shape.

The size and shape of the engineered composite is designed to obtain a slow release and is dependent on the subterranean conditions.

Smaller particles of the composite granules, when mixed granules of larger particle size, and when placed in aforementioned oilfield fluids, dissolve faster than the larger particles due to larger surface area to volume ratio. Thus by adjusting the ratio of smaller to larger particles, the rate of dissolution was controlled.

The rate of dissolution also was controlled by the shape of the particle. The ratio of surface area to volume for a perfect spherical particle is 3.0. When the same volume of a spherical engineered composite is extruded into a cylindrical granule, with a length to diameter ratio of 2, the surface area to volume ratio increases to 3.6, thus exposing more surface and increasing dissolution rate. The same volume of a spherical engineered composite when spun into a fiber, with a length to diameter ratio of 50, the surface area to volume ratio increases to 8.5, thus exposing more surface and increasing dissolution rate. Surface to volume ratios can be calculated for various shapes and the composite formed into a desired shape to render a desired dissolution rate.

In some cases additive materials are incorporated into the engineered composite to modify specific gravity of the engineered composite to be near the specific gravity of the drilling fluids. The specific gravity of the engineered composite may be adjusted to be between about 0.8 and 5.0, preferably between 1.0 and 2.0, even more preferably between 1.1 and 1.5.

Specific gravity of engineered composites can be modified with impervious weighting agents selected from a group consisting of bauxite, magnetite, sand, hematite, other dense inorganic, and organic compounds having a specific gravity higher than 1.3.

In one embodiment, the engineered composite of the invention is particularly efficacious in the treatment of scales of metal salts such as calcium, barium, and magnesium salts, and specifically, barium sulfate, barium carbonate, calcium sulfate, and calcium carbonate scales. Engineered composites also may have applicability in the treatment of other inorganic scales, such as zinc sulfide and iron sulfide.

Suitable scale inhibitors include strong acidic materials such as a hydrochloric acid, phosphonic acid, phosphoric acid, phosphorous acid, phosphate esters, phosphonate/phosphonic acids, amino-poly carboxylic acids, chelating agents, and polymeric inhibitors and salts thereof.

Other scale inhibitors include organophosphonates, organo phosphates and phosphate esters as well as the corresponding acids and salts thereof.

Phosphonate/phosphonic acid type scale inhibitors are often preferred in light of their effectiveness to control scales at relatively low concentration.

Polymeric scale inhibitors made from various monomers such as acrylic or methacrylic acid/nitrile/amides/esters/quaternary amines, acrylamido-alkyl sulfonates, maleic, vinyl, Schiff base polymers or salts of various polymers are also effective scale inhibitors. Such polymers contain pendant groups such as, but not necessarily limited to sulfonate, carboxylate, amino, and phosphonate, which chelate the scale forming metals. Polymers such as polyvinyl sulfonate, copolymers of acrylamide and maleic acid, copolymers of acrylamide and acrylamido-alkyl sulfonates, are commercially used as scale inhibitors.

In another embodiment, chelating agents, for examples EDTA, DTPA, GLDA, and polymers containing phosphonates and carboxylates, have been found to be effective for both removal and inhibiting deposits of brines.

The engineered composite does not require large concentrations of well treatment agents. The amount of well treatment agent in the engineered composite is that amount sufficient to provide the desired result over a sustained period of time. Generally, the amount of well treatment agent in the engineered composite is from about 1% to about 95% based upon the total weight of the engineered composite. The amount of well treatment agent required typically is dictated by the metallic contaminants in the subterranean water and the desired treatment period. For example, a desired release rate may be 1 ppm of the desired treatment agent over a 2 years period. Thus, that rate would be used as a basis for calculating the desired treatment agent concentration, the relative sizes of the granules, and the shape of the engineered composite granules.

For example, where the well treatment agent is a scale inhibitor, the amount of scale inhibitor present in the engineered composite is that amount required to prevent, or to at least substantially reduce the degree of scale formation. For most applications, the amount of scale inhibitor in produced fluids may be as low as 1 ppm. Release of scale inhibitor well treatment from the engineered composite may typically be sufficient to provide up to six months of continuous inhibition.

The weight ratio of well treatment agent to the other components in the engineered composite is generally between from about 95:5 to about 5:95.

The engineered composite limits the availability of the free well treatment agent in water and in crude oil. When placed into a production well, the well treatment agent slowly dissolves at a generally constant rate over an extended period of time in the water or crude which is contained in the formation. The controlled slow release of the agent is dependent upon the solubility of the engineered composite in the water and crude present in the formation. The solubility of the composite is controlled by increasing the content of the polymer with greater solubility or decreasing the concentration of the polymeric component of lower solubility.

For example, at neutral pH, polylactic acid is known to dissolve at a slower rate than at higher pH. If the subterranean conditions are basic, the polylactic concentration in the composite will be reduced.

Generally, the lifetime of a treatment using the engineered composite of the invention is more than one month and up to five years, but preferably for at least six months, depending upon the volume of oil and water produced in the production well, the amount of well treatment agent in the engineered composite and the amount of engineered composite placed in the formation. Operators and service companies routinely determine the amount of treatment agents required for a specific job by testing the oil and water in a specific zone.

Well treating compositions in accordance with the invention include the engineered composite. The carrier fluid may be a brine, salt water, fresh water, and other fracturing fluids generally referred to as gels which are either cross linked, linear, etc. or slick water (water containing polymers), a liquid hydrocarbon, or a gas such as nitrogen or carbon dioxide. Suitable fluids may include, for example, fracturing fluids, completion fluids, or acidizing compositions.

The engineered composite may further contain between from 0 to about 10 weight percent of an inorganic base.

Inorganic bases may be selected from the group that includes oxides, hydroxides, and carbonates, bicarbonates of sodium, potassium, calcium and ammonia.

The engineered composite may further contain between from 0 to about 10 weight percent of an inorganic and organometallic salt. Suitable inorganic salts include sulfates, halides, nitrates, and carboxylates of sodium, potassium, and ammonia.

The engineered composite may further contain between 0 and about 10 weight percent of an inorganic acid. Suitable inorganic acids include HCl, HBr, $HNO_3$, $H_3PO_4$, $H_2SO_4$, and H3PO3.

The well treating composition of the invention may be used in stimulation treatments as a component of a fracturing fluid or acidizing fluid, such as a matrix acidizing fluid.

The engineered composite may be used in conjunction with completion fluids containing zinc bromide, calcium bromide calcium chloride and sodium bromide brines. Such fluids may be introduced down the annulus of the well and, when desired, flushed with produced water.

In a particularly embodiment, the engineered composite of the invention was used in fluids used for the treatment of gas wells or oils wells wherein it is desired to inhibit the formation of scales, control the formation of scales or retard the release of scale inhibitors into the well. For instance, the engineered composite may be used in completion or production services.

The engineered composites may be used in the well to remove scales from or control the formation of scales onto tubular surface equipment within the wellbore.

The engineered composites are designed to be pumped along with proppant during hydraulic fracturing, especially in horizontal wells, as well as in more traditional vertical wells.

Vertical wells can be "squeeze" treated, but the cost of squeeze treating horizontal wells is prohibitive as there are many stages and packers that typically have to be used to isolate and treat a stage at a time. Squeeze treating is defined as pumping small amounts treatment agents periodically (e.g. every week or two weeks) into the shale.

Engineered composites are to be placed in the fracture along with proppant so they slowly and sustainably deliver well treatment chemicals to produced fluids.

Other embodiments within the scope of the claims herein will be apparent to one skilled in the art from consideration of the specification and practice of the invention as disclosed herein. It is intended that the specification, together with the Examples, be considered exemplary only, with the scope and spirit of the invention being indicated by the claims which follow.

Example 1

500 lbs. of ATMP (amino tris(methylene phosphonic acid), CAS 6419-19-8, were reacted with 101.50 lbs. of light burnt Magnesium Oxide to form a Magnesium Salt of ATMP. Fifty (50) lbs. of this Magnesium Salt of ATMP was extruded in an under-water micro pelletizer along with fifty (50) lbs. of Ethylene Vinyl Acetate (Ateva 3325A from Celanese) to form a basic composite.

Example 2

500 lbs. of ATMP (amino tris(methylene phosphonic acid), were reacted with 101.50 lbs. of light burnt Magnesium Oxide to form a Magnesium Salt of ATMP. Fifty (50) lbs. of this Magnesium Salt of ATMP was extruded in an under-water micro pelletizer along with twenty-five (25) lbs. of Ethylene Vinyl Acetate (Ateva 3325A from Celanese) and twenty-five (25) lbs. of polylactic acid to form a composite with multiple polymers.

Example 3

500 lbs. of ATMP (amino tris(methylene phosphonic acid), were reacted with 101.50 lbs. of light burnt Magnesium Oxide to form a Magnesium Salt of ATMP. Fifty (50) lbs. of this Magnesium Salt of ATMP was extruded in an under-water micro pelletizer along with fifty (50) lbs. of Ethylene Vinyl Acetate (Ateva 3325A from Celanese) and fifty (50) lbs. of phthalic anhydride to form a composite with multiple polymers with a faster dissolution characteristics.

Example 4

Five hundred (500) lbs. of ATMP (amino tris(methylene phosphonic acid), CAS 6419-19-8, were reacted with 101.50 lbs. of light burnt Magnesium Oxide to form a Magnesium Salt of ATMP. Fifty (50) lbs. of this Magnesium Salt of ATMP was extruded in an under-water micro pelletizer along with fifty (50) lbs. of Ethylene Vinyl Acetate (Ateva 3325A from Celanese) and fifty (50) lbs. of impervious silica flour to form a composite of higher density.

Example 5

Five hundred (500) lbs. of ATMP (amino tris(methylene phosphonic acid), were reacted with 101.50 lbs. of light burnt Magnesium Oxide to form a Magnesium Salt of ATMP. Fifty (50) lbs. of this Magnesium Salt of ATMP was extruded in an under-water micro pelletizer along with forty (40) lbs. of Ethylene Vinyl Acetate (Ateva 3325A from Celanese) and twenty (20) lbs. of dioctyl phthalate to form another composite with a plasticizer to lower the glass transition temperature and to increase solubility.

Example 6

Five hundred (500) lbs. of ATMP (amino tris(methylene phosphonic acid), were reacted with 101.50 lbs. of light burnt Magnesium Oxide to form a Magnesium Salt of ATMP. Fifty (50) lbs. of this Magnesium Salt of ATMP was extruded in an under-water micro pelletizer along with twenty-five (25) lbs. of Ethylene Vinyl Acetate and twenty-five (25) lbs. of polylactic acid, and twenty-five (25) lbs. of phthalic anhydride to form yet another composite of increased solubility and higher specific gravity.

Evaluation of Scale Inhibitor Composite

A length of 2" PVC pipe, 30" in length, was fitted with provisions to attach tubing to each end such that water or other fluids could be injected at one end and injected fluids exit at the other end. The column was filled with 2,100.6 gm of 20/40 mesh Ottawa White sand containing 21.0 g of the composite manufactured in Example 1. The sand and composite were intimately mixed so as to disperse the composite product throughout the entire sand column.

The amount of tap water required to fill the void spaces in the sand column was 506.3 ml. Thus, the pore volume of the test column was 506.3 ml.

A peristaltic pump was employed to pump water into the bottom of the column at the rate of 125 ml/min. The effluent from the top of the column was collected periodically and analyzed for the presence of phosphorous by ion chromatography. The phosphorous levels were then plotted against pore volume as set forth in the FIGURE. Phosphorous content is directly proportional to the amount of scale inhibitor released into the water. Furthermore, the amount of water pumped through the column is measured in pore volume, a term used in the oilfield to describe the available space for flow of oil and water into the fractures.

That which is claimed is:

1. A method for controllably releasing well-treating agents into a subterranean formation to treat the subterranean formation after fracking, wherein releasing the well-treating agents shall occur during a time period of between one month and five years, comprising:
   a. adding the well-treating agents to an engineering composite substrate to form an engineered composite; wherein the engineered composite comprises magnesium amino tris(methylene phosphonic acid), the well treating agents, and the engineering composite substrate, which comprises a copolymer of ethylene and vinyl acetate;
   b. injecting the engineered composite into the subterranean formation;
   c. controllably releasing the well-treating agents from the engineered composite as the engineering composite substrate slowly dissolves at a constant rate in oil or water, without leaving any residue to decrease conductivity within the subterranean formation; and
   d. treating the subterranean formation after fracking with the controllably released well-treating agents.

2. The method as in claim 1 wherein at least one of the well-treating agents is selected from the group consisting of corrosion inhibitors, paraffin inhibitors, salt formation inhibitors, gas hydrate inhibitors, scale inhibitors, asphaltene inhibitors, asphaltene dispersants, defoamers, oxidizers, oxygen scavengers, biocides, foaming agents, emulsion breakers, and surfactants.

3. The method as in claim 1 wherein the rate of dissolution is controlled by the size and shape of the engineered component.

4. The method as in claim 1 wherein the engineered composite is added to the subterranean formation with a fracking fluid.

* * * * *